July 5, 1966
N. J. RYSKAMP
3,259,203
SEAT ACTUATED VEHICLE BRAKE MECHANISM
Filed June 30, 1964
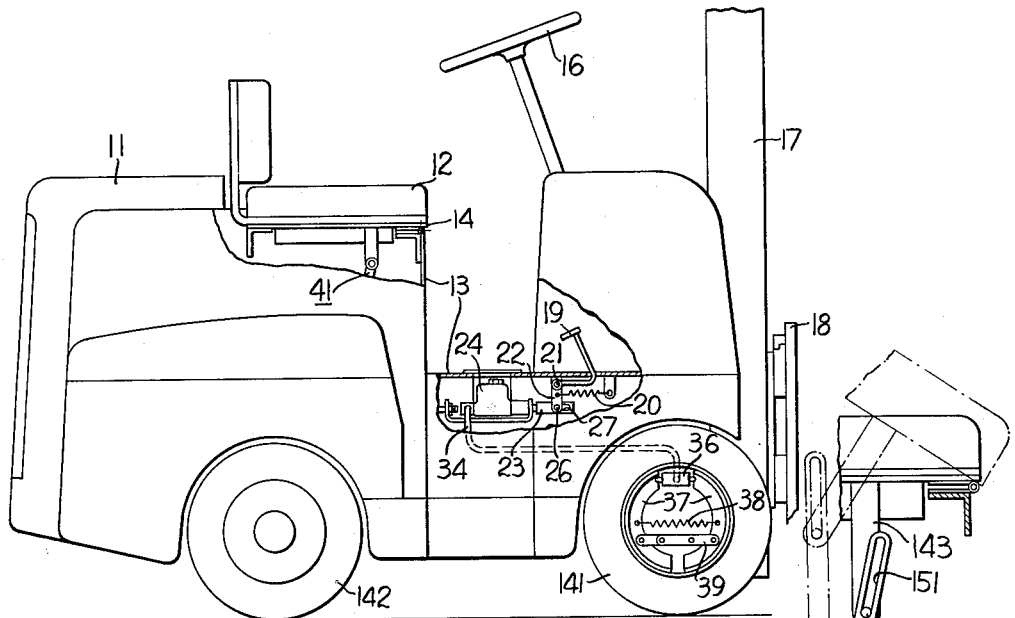
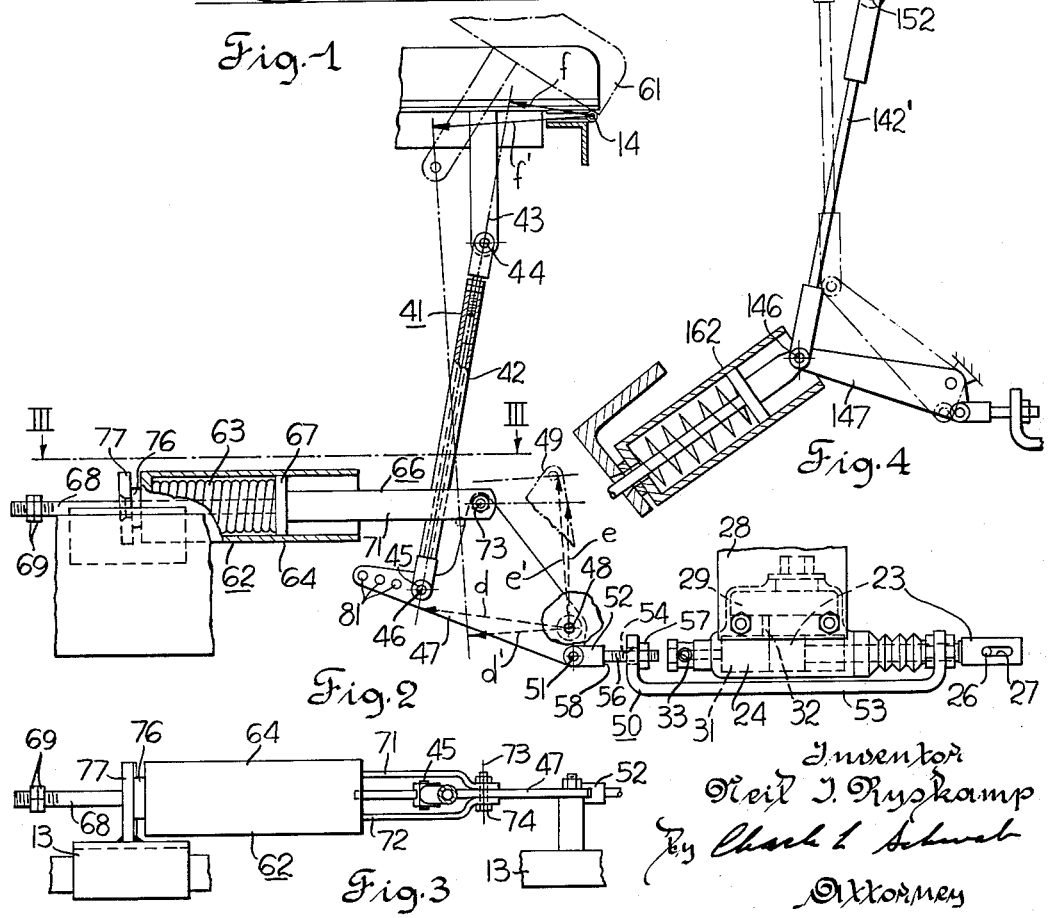
Inventor
Neil J. Ryskamp
By Charles L. Schwab
Attorney

United States Patent Office 3,259,203
Patented July 5, 1966

3,259,203
SEAT ACTUATED VEHICLE BRAKE MECHANISM
Neil J. Ryskamp, Markham, Ill., assignor to Allis-Chalmers Manufacturing Company, Milwaukee, Wis.
Filed June 30, 1964, Ser. No. 379,317
9 Claims. (Cl. 180—82)

This invention relates to a braking mechanism for a vehicle and particularly to a safety braking system known generally as a dead man seat brake.

Heretofore others have provided dead man seat brakes of various types and constructions however, they have not been entirely satisfactory as to construction and performance.

It is an object of this invention to provide a seat brake mechanism utilizing spring means to actuate a vehicle brake and raise a seat when unoccupied which can be applied to an existing vehicle braking system.

It is a further object of this invention to provide a seat brake mechanism wherein the spring for raising the seat and for operating the brake has increased mechanical advantages over the brake and the seat as the seat is raised.

It is a further object of this invention to provide a seat brake mechanism of the hereinbefore outlined character which connects with the usual braking system of the vehicle through a lost motion connection permitting the regular foot brake to be utilized independently of the seat brake mechanism.

It is a further object of this invention to provide a seat brake mechanism wherein the linkage between the seat and the brake operating means includes a pair of opposed wedge or toggle linkages.

It is a further object of this invention to provide a braking mechanism for a vehicle utilizing an automatic brake adjuster for the wheel brake and a brake operating means common to both the foot operated brake pedal and the seat operated brake applying linkage.

These and other objects and advantages of this invention will be apparent to those familiar with the art when the following description is read in conjunction with the drawings in which:

FIG. 1 is a side view of a lift truck in which the present invention is incorporated with portions of the truck broken away for illustration purposes;

FIG. 2 is a side view showing a seat brake mechanism incorporated in the truck of FIG. 1;

FIG. 3 is a section view taken along the line III—III in FIG. 2; and

FIG. 4 is an alternate construction of the invention.

Referring to FIGS. 1, 2 and 3, the lift truck 11 includes a driver's seat 12, pivotally mounted on the chassis 13 of the truck by a hinge connection having a transverse pivot axis 14, a steering wheel 16 and a mast 17 with a load supporting carriage 18. Truck 11 also includes a foot operated brake pedal 19 biased by tension spring 20 to a brake released position and pivotally mounted on the chassis 13 on a transverse axis by a pin 21. The foot pedal 19 has a pending arm 22 which is pivotally connected to a plunger 23 of master cylinder 24 through a pin 26 extending through slot 27. The master cylinder 24 is secured to a bracket 28 of the lift truck chassis 13 and includes an upper reservoir portion 29 connected to pressure chamber 31 through a passage 32. Chamber 31 communicates with an outlet 33 to which the wheel cylinder line 34 is connected. The wheel cylinder line 34 is connected at its front end to wheel cylinder 36 in a conventional manner. The expandable brake shoes 37 are biased to a retracted position by a return spring 38 and an automatic brake adjuster 39 automatically adjusts the brakes to compensate for wear. The brake adjuster 39 is of the type shown in my copending patent application Serial Number 284,587, Mechanical Type Automatic Brake Adjuster, now Patent Number 3,195,689. As illustrated, wheel brakes are provided only for the front drive wheels 141, only one of which is shown, although the rear steerable wheels 142 could be provided with wheel brakes also. By providing an automatic brake adjuster 39 for the wheel brakes it is not necessary to make brake wear compensating adjustments of the seat brake mechanism, which will hereinafter be described.

The seat brake linkage 41 of my invention provided between the seat 12 and the master cylinder 24 includes an upright link 42 which is pivotally connected at its upper end to a depending bracket 43 of the seat 12 on a transverse pivot axis 44. The lower end of the link 42 is pivotally connected on a transverse pivot axis 46 to a lever 47 which in turn is pivotally mounted on the chassis 13 of the vehicle for pivotal movement about a transverse pivot axis 48 between the brake release position illustrated in full line to a brake applied position illustrated in dot-dash lines 49. A downward extending portion of the lever 47 is pivotally connected to linkage means 50 on a transverse pivot axis 51. The linkage means 50 includes a yoke member 52 and a link 53. The link 53 is rigidly connected at its forward end to the plunger 23 and has a lost motion connection at its rear end with yoke 52. An enlarged bore 54 in the rear end of link 53 permits a threaded portion 56 of the yoke 52 to slide freely within the limits of nut 57 and shoulder 58.

The seat 12 is biased toward its raised, unoccupied position shown in dot-dash lines 61 in FIG. 2 and the lever 47 toward its brake engaged position 49 by resilient biasing means in the form of spring loaded link 62 which includes a compression spring 63 disposed between the cylindrical member 64 and a reciprocating member 66. The reciprocating member 66 has a round button portion 67 secured as by welding to a rod 68, the rear end of which is threaded to receive a pair of lock nuts 69, and a pair of forwardly extending arms 71, 72, best shown in FIG. 3, which are connected to the lever on a transverse pivot axis 73 by a bolt 74. A rubber-like washer 76 is interposed between the cylindrical member 64 and a bracket 77 secured as by welding to the chassis 13.

When the biasing means 62 moves the lever 47 from its brake released position, as illustrated in full line in FIG. 2, to its brake applied position 49, the lever arm distance increases from e to e' and the lever arm distance between the pivot axis 48 and linkage means 52, 53 is slightly reduced. Thus as the brake is applied the spring means 62 has an increased mechanical advantage over the brake operating means. Additionally, as the biasing means 62 expands, the lever arm distance between pivot axis 48 and the link 42 decreases from d to d' while the lever arm distance between pivot axis 14 and link 42 increases from f to f'. Thus an increased mechanical advantage is achieved by the biasing means 62 over the seat 12 as the seat is raised to its unoccupied position 61. Thus, when the seat is in its raised position less force is required to maintain it in such a position thereby permitting greater force to be applied to the brake operating means 50. Also it is seen that as the operator occupies the seat, thereby moving it to its position illustrated in FIG. 1, the seat with the operator's weight thereon has an increased mechanical advantage over the spring means 62. This is desirable since it helps the operator keep the seat down when the truck bounces over uneven floors or terrain.

The lost motion connection between yoke 52 and link 53 permits the operator to apply the wheel brakes through operation of foot pedal 19 independently of seat brake mechanism. The spring 38 attached to the brake shoes 37, forces fluid from wheel cylinder 36 back into the master cylinder chamber 31 thereby forcing the plunger 23 to the position illustrated in FIG. 2. The slot 27 in the end of plunger 23 permits the seat brake to operate the master cylinder 24 without operating against the effect of spring 20 and without causing movement of the foot brake pedal 19.

The pin 45 may be installed in one of the other holes 81 for a different weight operator.

From an operational standpoint the link 42 and lever 47 are a toggle or wedge linkage acting in opposition to a toggle constituted by spring loaded link 62 and lever 47. Placing the pivot axis 44 below the seat pivot axis 14 affords an additional mechanical advantage over the seat to that afforded by the toggle 42, 47 as the axis 46 thereof moves nearer to an in line position with axes 44, 48. The mechanical advantage of the wedge linkage represented by link 42 and lever 47 increases as the mechanical advantage of the wedge linkage represented by spring loaded link 62 and lever 47 decreases. However, the spring means 62 has an increased mechanical advantage over both the seat and the brake operating means 50 as the seat is raised.

FIG. 4 illustrates a second embodiment of my invention wherein the spring loaded link 162, and link 142' are pivoted to lever 147 on a common transverse axis 146. A slot 151 affords a lost motion connection with pin 152 on seat bracket 143 permitting the seat to be pivoted forwardly against the steering wheel 16 to afford greater servicing access to the area below the seat which is the area in which the engine and accessories are installed. The positioning of the master cylinder 24 and the limited space available on some trucks for the seat operated linkage may make the embodiment in FIG. 2 preferable to that of FIG. 4.

The embodiments of the invention in which an exclusive property or privilege is claimed are defined as follows:

1. A braking system for the wheels of a vehicle comprising:
   a vehicle chassis,
   a friction type wheel brake including a wheel cylinder,
   a master cylinder having a plunger in communication with said wheel cylinder,
   brake adjusting means for automatically compensating for wear of said wheel brake,
   a brake pedal pivotally mounted on said chassis,
   operating linkage connecting said brake pedal to the plunger of said master cylinder,
   a seat pivotally connected to said chassis for vertical swinging movement between an operator occupied position and a raised unoccupied position, and
   a brake actuating linkage between said master cylinder and said seat including,
      a pair of toggle links having their adjacent ends pivotally connected to one another on a first axis,
      means pivotally connecting one of said links to said chassis on a second axis parallel to and spaced from said first axis,
      means providing a lost motion connection between said one link and said plunger and effecting movement of said plunger when one link is pivoted in a first direction about said second axis,
      means pivotally connecting the other of said links to said seat on an axis spaced from said first and second axes and from the pivot connection between said seat and said chassis,
      resilient biasing means urging said one link to pivot in said one direction to a brake applying position,
      said biasing means swings said seat to its unoccupied position, when unoccupied, and simultaneously effecting actuating of said brake, the mecanical advantage of said resilient biasing means on said seat and said plunger increasing as said seat moves toward its unoccupied position.

2. A braking mechanism for the wheels of a vehicle comprising:
   a vehicle chassis,
   a wheel braking mechanism including,
      a wheel brake,
      a foot pedal pivotally connected to said chassis,
      force transmitting means between said foot pedal and said wheel brake for applying the latter upon pivotal movement of said brake pedal, and
      means resiliently biasing said foot pedal toward a wheel brake released position, and
   a seat actuated brake applying mechanism including
      a seat pivotally mounted on said chassis for vertical swinging movement about a first transverse axis between occupied and raised position,
      a lever pivotally mounted on said chassis on a second transverse axis and having a lost motion connection with said force transmitting means,
      a link having one end pivotally connected to said seat on a third transverse axis in spaced relation to said first axis and having its other end pivotally connected to said lever on a fourth transverse axis in spaced relation to said second and third axes, said link and lever forming a toggle linkage, and
      resilient means biasing said link and lever toward said seat raised position in which said second, fourth and third axes define an obtuse angle, with the fourth axis as the vertex, substantially greater than 90 degrees and less than 180 degrees,
      said seat having a greater mechanical advantage over said resilient means in its occupied position than in its raised position and said resilient means having a greater mechanical advantage over said seat and over said force transmitting means in the raised position of said seat than in said occupied position of said seat.

3. The structure set forth in claim 2 wherein said resilient biasing means includes a spring acting between a first point on said chassis and a second point on said lever, the angle defined by said points and said second axis, with the second point as the vertex, increasing as said angle defined by said second, fourth and third axes, with said fourth axis as the vertex, decreases.

4. The structure set forth in claim 3 wherein said second point lies in the pivot connection between said link and lever.

5. A braking mechanism for the wheels of a vehicle comprising:
   a vehicle chassis,
   a wheel braking mechanism including,
      a vehicle brake,
   a seat actuated brake applying mechanism including
      a seat pivotally mounted on said chassis for vertical swinging movement about a first transverse axis between occupied and raised positions,
      a lever pivotally mounted on said chassis on a second transverse axis,
      actuating means interconnecting said brake and said lever,
      a link having one end pivotally connected to said seat on a third transverse axis in spaced relation to said first axis and having its other end pivotally connected to said lever on a fourth transverse axis in spaced relation to said second and third axes, said link and lever forming a toggle linkage, and
      resilient means biasing said link and lever toward said seat raised position in which said second, fourth and third axes define an obtuse angle,